United States Patent
Batistic

(10) Patent No.: US 6,208,928 B1
(45) Date of Patent: Mar. 27, 2001

(54) METHOD OF IMPROVING ABS CONTROL BEHAVIOR

(75) Inventor: Ivica Batistic, Frankfurt am Main (DE)

(73) Assignee: Continental Teves AG & Co., oHG, Frankfurt (DE)

(*) Notice: Subject to any disclaimer, the term of this patent is extended or adjusted under 35 U.S.C. 154(b) by 0 days.

(21) Appl. No.: 09/214,948

(22) PCT Filed: Apr. 22, 1997

(86) PCT No.: PCT/EP97/02025

§ 371 Date: Aug. 19, 1999

§ 102(e) Date: Aug. 19, 1999

(87) PCT Pub. No.: WO98/03380

PCT Pub. Date: Jan. 29, 1998

(30) Foreign Application Priority Data

Jul. 18, 1996 (DE) .............................................. 196 28 979

(51) Int. Cl.$^7$ ...................................................... B60T 8/00
(52) U.S. Cl. ................................. 701/72; 701/74; 303/163
(58) Field of Search .................................. 701/71, 72, 74, 701/78; 180/197; 303/167, 169, 191, 163, 146, 147, 140

(56) References Cited

U.S. PATENT DOCUMENTS

| | | | |
|---|---|---|---|
| 5,272,636 | * 12/1993 | Buschmann et al. | 701/72 |
| 5,302,010 | * 4/1994 | Ehmer et al. | 303/147 |
| 5,312,169 | * 5/1994 | Buschmann | 303/140 |
| 5,494,344 | * 2/1996 | Heyn et al. | 303/140 |

FOREIGN PATENT DOCUMENTS

| | | |
|---|---|---|
| 34 13 738 | 10/1985 | (DE) . |
| 39 19 347 | 2/1990 | (DE) . |
| 39 05 045 | 8/1990 | (DE) . |
| 43 34 819 | 4/1993 | (DE) . |
| 43 05 155 | 8/1994 | (DE) . |
| 43 32 820 | 3/1995 | (DE) . |
| 44 41 624 | 5/1996 | (DE) . |
| 196 22 839 | 12/1996 | (DE) . |
| 195 22 632 | 1/1997 | (DE) . |
| 195 22 634 | 1/1997 | (DE) . |
| 545 325 | 6/1993 | (EP) . |

OTHER PUBLICATIONS

Search Report of the German Patent Office Relating to Parent German Patent Application 196 28 979.3.
Article from ATZ Automobiltechnische Zentschrift (1995) Entitled "Bremsen und Schlupf–Regelsysteme der Neuen 7er–Reihe von BMW" by Von Heinz Leffler, et al..
Article from ATZ Automobiltechnische Zentschrift 98 (1996) Entitled "Bremsanlage und Schlupfregelungs–systeme der Neuen Baureihe 5 von BMW" by Von Gerhard Kurz, et al.

* cited by examiner

Primary Examiner—Michael J. Zanelli
(74) Attorney, Agent, or Firm—Rader, Fishman & Grauer PLLC

(57) ABSTRACT

In a method of improving the control behavior of an anti-lock control system, in particular, of the steerability and driving stability during deceleration in a curve, the slip condition of the individual wheels, by determining a slip differential value ($SD_i$), namely the difference between the momentary wheel slip ($\Delta v$) and the filtered wheel slip ($fws_i$) and a slip integral or slip summation value ($SI_i$) are detected. The said slip summation value ($SI_i$) is formed by integration of the difference between the momentary wheel slip ($\Delta v_i$) and a predetermined permissive slip value ($S_{erl.}$). Based on these quantities, a wheel condition value is determined which represents the angular slip of the wheel or the transverse dynamics of the wheel. By comparing the values of angular slip of the individual vehicle wheels it is possible to determine the vehicle condition, in particular, an "understeering" or "oversteering" situation.

4 Claims, 1 Drawing Sheet

METHOD OF IMPROVING ABS CONTROL BEHAVIOR

BACKGROUND OF THE INVENTION

The present invention relates to a method of improving the control behavior of an anti-lock control system, in particular, for improving the steerability of the automotive vehicle and the driving stability when driving around a curve, wherein a vehicle reference speed is derived from the rotating behavior of the vehicle wheels and criteria are obtained for identifying a cornering situation and the direction of a curve, and wherein, upon identification of a cornering situation, a special or curve control mode is initiated in lieu of the standard control mode, thereby causing already in the partial deceleration area a reduction of the brake pressure on the front wheel on the inner side of the curve and/or on the rear wheel on the inner side of the curve, and wherein filtered wheel slip values are formed and evaluated for identifying a cornering situation.

During identification of a cornering situation, in a control method of the afore-described type, a moment of yaw balancing and stabilizing the cornering situation is generated about the vertical axis of the automotive vehicle through the pressure relief on the wheels on the inner side of the curve. The brake pressure on the wheels on the outer side of the curve, upon commencement of the control during a partial deceleration, is kept constant or is automatically increased in that a further brake pressure build-up on the wheel(s) on the inner side of the curve is precluded.

DE 34 13 738 C2 already discloses an anti-lock control system (ABS) comprising a system for identifying a cornering situation equally based on wheel slip measurement. For identifying a cornering situation, the slip values on the wheels on one side of the automotive vehicle are summed up and compared to the summation of slip on the other side of the vehicle to generate a signal identifying a cornering situation as soon as the difference between the slip summations exceed a predetermined threshold value. Upon identification of a cornering situation, selective criteria, such as "select-low" or "select-high" according to which the course of pressure is controlled in the individual brake pressure control channels of the said brake system, and threshold values for causing the said selective criteria to take effect will be varied, thereby enabling the control to be adapted to the varying conditions when driving straight-forward and when driving about a curve.

DE 21 19 590 A1 teaches to generate a signal for identifying a cornering situation with the aid of a transverse acceleration meter, such as a mercury switch.

Moreover, it is already known in the art to extend the functions of an ABS system in that the system is employed for improving the driving stability and the deceleration stability, respectively, when driving about a curve. To that effect, during cornering and during a partial deceleration, i.e. a deceleration process in which the ABS response thresholds are not achieved, a stabilizing moment about the vertical axis of the automotive vehicle is caused by a pointed delay of the brake pressure build-up on the wheels on the inner side of the curve compared to the brake pressure on the wheels on the outer side of the curve ("Bremsanlage und Schlupf-Regelsystem der neuen 7er-Reihe von BMW" ("Brake system and slip control system of the new BMW series No. 7"), ATZ 97 (1995), pp. 8–15; and "Bremsanlage und Schlupf-Regelungssysteme der neuen Baureihe 5 von BMW" ("Brake system and slip control systems of the new BMW series No. 5"), ATZ 98 (1996), pp. 188–194). In the absence of a steering angle sensor, the information on the current steering angle is derived from the transverse acceleration which, in turn, is computed from the wheel sensor signals.

The calculation of the filtered wheel slip and the evaluation of this quantity for determining criteria referring to a cornering situation have been described in non-prior-published patent applications DE 195 22 634 A1 and DE 195 22 632 A1. For identifying a cornering situation, according to these literature references, the filtered wheel slip values are compared to one another and are evaluated. Switching over to a cornering control mode occurs, once the filtered wheel slip on both front wheels and the filtered wheel slip on a rear wheel are above a predetermined maximum slip value and the filtered wheel slip on the second rear wheel a the same time is below a predetermined minimum value.

It is the object of the present invention to provide a method intended to improve the control behavior of an ABS system in a cornering situation already prior to reaching the actual ABS-threshold values in that the cornering situation is reliably identified alone from the wheel rotating behavior and, through interference with the deceleration process, a stabilizing moment about the vertical axis of the automotive vehicle is generated in a deceleration process upon occurrence of a cornering situation.

It has been found that this problem can be solved by a method involving the step of detecting the slip condition of the individual wheels by determining a slip difference value, i.e. the difference between the momentary wheel slip and the filtered wheel slip, and a summation slip value formed by integration of the difference between the momentary wheel slip and a predetermined permissive slip value, further including the step of detecting, by evaluation of the slip difference value and the summation slip value, a wheel-condition value, in particular, a value representing the angular slip or the transverse dynamics of the wheel which can, therefore, be evaluated for identifying a cornering situation, and further including the step of determining the condition of the vehicle by comparing the values of the angular slip of the individual wheels of the automotive vehicle.

SUMMARY OF THE INVENTION

According to a preferred embodiment of the invention, in determining the wheel condition, an approximately constant slip difference of e.g. ±1 km/h below a predetermined threshold value is evaluated as a reference to or a criterion for a constant angular slip which is indicative of that a cornering situation has been identified. The constant, relatively low slip difference value is indicative of the presence of a so-called transverse dynamics of the wheel. Compared thereto, a high slip difference value is indicative of a high longitudinal dynamics and, hence, of a situation of straight-forward driving.

It has proved to be advantageous to select a slip value of about 0.5–3%, preferably 1–2%, of the vehicle speed or vehicle reference speed as a permissive slip value. In respect of the front wheels, a slip of about 3% of the vehicle (reference) speed and in respect of the rear wheel a slip of about 1–2% of the vehicle (reference) speed, is permissive.

According to another advantageous embodiment of the invention, in determining the vehicle condition, an approximately constant angular slip on both wheels on one side of the vehicle side is deemed indicative of a cornering situation, while a constant angular slip detected only on the front axle is deemed indicative of an understeering situation of the vehicle. A constant angular slip occurring only on the rear axle is indicative of an understeering situation.

Further details, advantages and fields of application of the invention will become manifest from the following description with reference to the drawing.

BRIEF DESCRIPTION OF THE DRAWING

The FIGURE shows schematically, in the form of a block diagram, the essential electronic components of a circuit arrangement for applying the method of the invention.

DETAILED DESCRIPTION OF THE DRAWING

Figure 1:
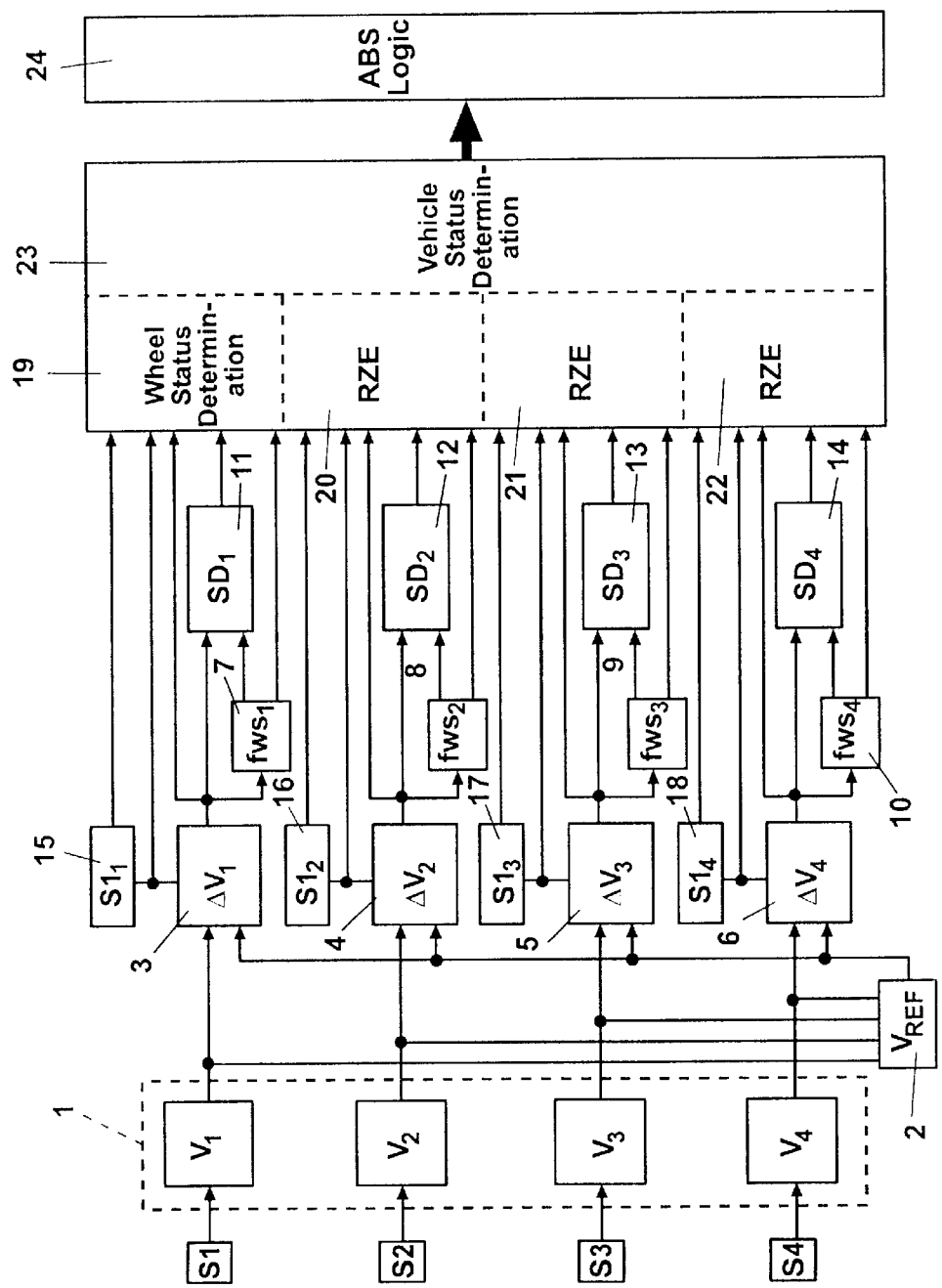

The circuit configuration as shown illustrates the basic way of operation of a circuit arrangement of an ABS-system additionally furnished with components for carrying into effect the method of the invention and, hence, for improving the control behavior when driving around a curve.

The input information for the anti-lock control according to the example of embodiment of the invention is obtained with the aid of wheel sensors S1 through S4 detecting the rotating behavior of each individual vehicle wheel. Reference characters S1 through S4 refer to passive or active sensors in which the rotary movement of the respective wheel furnished with a crown wheel or any other conventional detector, generates an output signal representing the rotary movement.

The vehicle wheels VL, VR, HL, HR are also schematically shown.

After processing the sensor output signals, information or data is available representing the individual wheel speeds $V_1$ through $V_4$. The processing circuits are housed in a circuit block 1.

By logical combination of the wheel speed information or signals $V_1$ through $V_4$, a vehicle reference speed $V_{REF}$ is formed in a circuit 2 which is relied upon in lieu of the actual vehicle speed (not known) as a value of reference for determining the brake slip $\Delta V_1$ through $\Delta V_4$ of the individual wheels. For this purpose, the comparators and difference-forming steps 3 through 6 have been provided for computing the slip for each wheel according to the formula $$\Delta V_i = V_{REF} - \Delta V_i$$

$$i = 1 \ldots 4$$

Individually, a filtered wheel slip signal $fws_i$ ($i=1$ through 4) is formed according to the formula $$fws_n = fws_{n-1} + (\Delta v - fws_{n-1})/T$$

in a filter 7–10 with deep-pass characteristic for each wheel i, wherein "n" refers to the last working cycle and "n–1" to the penultimate working cycle. Finally, a slip difference $SD_i$ is determined for each individual wheel from both quantities, with $$SD_i = slipdiff_i = )\Delta v_i - fws_{ni}.$$

Finally, each individual wheel or each evaluation of the momentary slip values $)\Delta v_i$ of each individual wheel requires a computing step 15–18 which, in the present instance, is designated by slip integrator 15–18. By integration of the difference between the momentary slip value $\Delta v_i$ and a predetermined permissive slip value $S_{erl.}$ a slip summation value or a slip integral SI is computed (for each individual wheel) according to the formula $$SI = slipint = \int_{>0}^{n} ()\Delta v - S_{erl.})dt$$

The slip condition of each individual wheel, hence, can be assessed on the basis of the respective slip difference value SD, i.e. the difference between the momentary wheel slip $\Delta v_i$ of the said wheel i and the filtered wheel slip $fws_i$, and on the basis of the respective slip integral value or slip summation value SI. The evaluation of the slip difference value SD and the slip summation value SI forms a wheel condition value representing a measure for the angular slip or the transverse dynamics of a wheel.

The vehicle condition can then be concluded from comparing the values of angular slip of the individual vehicle wheels.

For determining the wheel condition, the output signals or output data of the circuit components described, i.e. the information on the momentary slip $\Delta v_i$, the filtered slip value $fws_i$, the slip differential value SD and $SD_i$, respectively, and the integral or the slip summation value SI and $SD_i$, respectively, for each individual wheel are supplied to an evaluation circuit 19–22 designated by RZE (wheel condition determination).

A minor differential amount of, for example, ±1 km/h in conjunction with a permanently existing slip are indicative of a deceleration process with a constant angular slip, i.e. transverse dynamics of the wheel, or of the presence of forces directed toward the wheels in a direction transverse to the driving direction, whereas a high differential amount refers to high wheel longitudinal dynamics. An angular slip of the wheel in that case can be excluded.

A slip value of, for example, 0.5–2% of the vehicle speed or vehicle reference speed $V_{REF}$ is selected as a permissive slip value $S_{erl.}$. A typical value for the permissive slip $S_{erl.}$ relative to the front axle, is at about 3% (or 2 to 4%) and, relative to the rear axle, is at about 1 to 2% of the vehicle reference speed. The slip integrator 15–18 forming the slip summation which will become operative as soon as the difference between the momentary slip value $\Delta v_i$ and the selected permissive slip value $S_{erl.}$ assumes a value<0, quasi represents a measure of the wheel condition or the wheel transverse dynamics, respectively.

For determining the vehicle condition, the forces acting upon the individual wheels and the wheel condition quantities, respectively, are compared. Special reference is to be made to the following cases:

(a) If a "constant angular slip" occurs on both wheels of one vehicle side, e.g. on the left-hand-side of the vehicle, with no angular slip existing on the wheels of the other (right-hand side) of the automotive vehicle, this is indicative of a deceleration process in a left-hand curve.

(b) If conditions are the other way round, this is indicative of a right-hand curve.

(c) If an approximately "constant angular slip" is identified only on the front wheels and not on the rear wheels, the condition of the vehicle is deemed "understeering".

(d) If a "constant angular slip" is identified on the rear wheels alone, this will refer to a cornering situation implying a so-called "oversteering" tendency.

The determination of the conditions of wheels and vehicle in accordance with the invention can be evaluated by the control systems in the most various ways. In an ABS-system, in the practice of the invention, the control behavior can be improved and a better steerability of the vehicle as well as a higher driving stability can be obtained on the basis of this information.

For determining the vehicle condition, a program step or a circuit configuration 23 is schematically shown which contains and evaluates the output signals of the individual circuits or operators 19–22 for each individual wheel. Finally, the output signal and the output data, respectively, for determining the vehicle condition is fed to the actual ABS logic 24 which, in known manner, causes an anti-lock control on the basis of complex algorithms.

For explanatory purposes and in the interest of a better understanding of the way of operation of the method according to the invention, the individual functions and steps are shown in the form of switch blocks and switch circuit configurations. In practice, these functions, in the event of an ABS system based on program-controlled circuit configurations, are incorporated into the program pattern.

What is claimed is:

1. A method of improving the control behavior of an anti-lock control systems of a four-wheel, two-axle vehicle, comprising the steps of:

A) measuring individual wheel speeds;

B) deriving a vehicle reference speed from the rotating behavior of the vehicle wheels;

C) obtaining criteria for identifying a cornering condition and the direction of the curve therefrom including the substeps of;

(i) generating filtered wheel slip values for each wheel by determining
a slip differential value between the momentary wheel slip and the filtered wheel slip and
a slip summation value which is formed by integrating the difference between the momentary wheel slip and a predetermined permissive slip value, and (ii) using the slip differential value and the slip summation value to determine a value representing at least one of the angular slip of the wheel and the wheel transverse dynamics D) analyzing at least one of said angular slip of the wheel and said wheel transverse dynamics for identifying said cornering condition, and wherein the cornering condition is further determined by comparing the angular slip values of the individual wheels of the automotive vehicle.

2. A method according to claim 1, wherein, in determining the angular slip value, an approximately constant slip differential value ($SD_i$) below a predetermined threshold value is deemed indicative of a constant angular slip and, hence, of an identified cornering situation.

3. A method according to claim 1, wherein, for determining the angular slip value, an approximately constant angular slip of both wheels on one side of the automotive vehicle is deemed indicative of a cornering situation.

4. A method according to claim 3, wherein a constant angular slip identified only on the front axle is deemed indicative of an understeering situation of the automotive vehicle, and a constant angular slip occurring only on the rear axle is deemed indicative of an understeering situation of the automotive vehicle.

* * * * *